United States Patent [19]
Tardy et al.

[11] Patent Number: 5,625,728
[45] Date of Patent: Apr. 29, 1997

[54] METHOD OF COUPLING A MULTI-CORE OPTICAL FIBER TO A PLURALITY OF SINGLE-CORE OPTICAL FIBERS

[75] Inventors: André Tardy, Egly; Michel Jurczyszyn, Ivry sur Seine, both of France

[73] Assignee: Alcatel N.V., Rijswijk, Netherlands

[21] Appl. No.: 565,836

[22] Filed: Dec. 1, 1995

[30] Foreign Application Priority Data

Dec. 2, 1994 [FR] France .................................. 94 14527

[51] Int. Cl.⁶ ............................ G02B 6/245; G02B 6/255
[52] U.S. Cl. ................................ 385/30; 385/42; 385/126
[58] Field of Search .................................... 385/28, 30, 39, 385/42, 46, 48, 50, 126, 115

[56] References Cited

U.S. PATENT DOCUMENTS

| | | | |
|---|---|---|---|
| 4,342,499 | 8/1982 | Hicks, Jr. | 385/126 |
| 4,465,335 | 8/1984 | Eppes | 385/72 |
| 5,029,961 | 7/1991 | Suzuki et al. | 385/126 |
| 5,170,450 | 12/1992 | Dahlgren | 385/43 |
| 5,400,428 | 3/1995 | Grace | 385/115 |
| 5,524,157 | 6/1996 | Yodo et al. | 385/42 |

FOREIGN PATENT DOCUMENTS

| | | |
|---|---|---|
| 0200194A3 | 11/1986 | European Pat. Off. . |
| 0611973A1 | 8/1994 | European Pat. Off. . |
| 2617292A1 | 12/1988 | France . |
| 2045458 | 10/1980 | United Kingdom ............ 385/126 |

*Primary Examiner*—Rodney B. Bovernick
*Assistant Examiner*—Ellen Eunjoo Kang
*Attorney, Agent, or Firm*—Sughrue, Mion, Zinn, Macpeak & Seas

[57] ABSTRACT

The present invention relates to a method of coupling a multi-core optical fiber to a plurality of single-core optical fibers, the multi-core optical fiber comprising N mutually parallel optical cores ($N \geq 4$) embedded in common optical cladding, and each of the single-core optical fibers comprising one optical core surrounded by optical cladding. In this method, the coupling is distributed over P coupling levels ($2 \leq P < N$), each coupling level including at least two single-core optical fibers. The coupling levels are offset longitudinally relative to one another along said multi-core optical fiber, and are such that each of said fibers belonging to the coupling levels is disposed parallel to and facing a core of the multi-core fiber, and is secured to the optical cladding of the multi-core fiber so as to obtain lateral evanescent-wave coupling.

9 Claims, 3 Drawing Sheets

METHOD OF COUPLING A MULTI-CORE OPTICAL FIBER TO A PLURALITY OF SINGLE-CORE OPTICAL FIBERS

The present invention relates to a method of coupling a multi-core optical fiber to a plurality of single-core optical fibers.

BACKGROUND OF THE INVENTION

The term "multi-core optical fiber" refers to an optical fiber comprising N mutually parallel optical cores (where N is not less than 4) embedded in common optical cladding, the majority of the light rays conveyed by the multi-core fiber being guided along the N cores thereof. Conventionally, each of the N cores of the multi-core fiber has a diameter of a few microns (in general in the range 7 µm to 10 µm) and is disposed on a circle of radius approximately equal to 40 µm inside the optical cladding, which optical cladding has an outside diameter of 125 µm.

A "single-core fiber" is a conventional optical fiber comprising one optical core surrounded coaxially by optical cladding, the majority of the light rays conveyed by the single-core fiber being guided along the core thereof. The diameter of the core of such a fiber is also in the approximate range 7 µm to 10 µm, the outside diameter of the optical cladding being 125 µm.

Naturally, both single-core fibers and multi-core fibers are surrounded by at least one protective layer of a suitable resin.

In order to couple a multi-core fiber of the above-mentioned type to a plurality of single-core fibers, in particular for branch connections, or end-of-line connections, etc., the most-commonly envisaged solution consists in performing coupling at an end section of the multi-core fiber by butt coupling one or more cores of the multi-core fiber to the cores of the single-core fibers. For example, such a solution for coupling a fiber having two cores to two single-core fibers by means of an intermediate element is described in an article entitled "Single-core to twin-core fiber connector" published in "Electronics Letters" dated Aug. 15, 1991, vol. 27, No. 17.

That solution is not satisfactory for coupling a multi-core fiber that includes at least four cores. Given the overall size of single-core fibers (the outside diameter of each single-core fiber is equal to that of the multi-core fiber), such butt coupling is in practice complex to perform without using an intermediate device (coupling tube, plane waveguide, etc.). But the accuracy required in aligning the intermediate device with the fibers in order to obtain the desired coupling, and the complexity of machining the intermediate device make that solution complex and costly.

Moreover, that solution does not make it possible to perform mere branch connections, i.e. to couple only some of the cores of the multi-core fiber: since the coupling is performed end-to-end, the optical transmission line must be cut, and putting back together its non-coupled cores is difficult.

In order to mitigate those drawbacks, an alternative solution could be applied that is known for coupling together two single-core optical fibers. That solution consists in performing lateral evanescent-wave coupling, and it is described, in particular, in an article entitled "Fabrication of an access coupler with single-strand multimode fibre waveguides" published in "Applied Optics" dated Nov. 1976, vol. 15, No. 11. in that solution the two single-core fibers to be coupled together are secured together over an interaction length that is a function of the desired coupling.

That technique cannot be applied to multi-core fibers since, for reasons of overall size and available space, it is impossible to dispose all the individual fibers at the same place around the multi-core fiber.

OBJECT AND BRIEF SUMMARY OF THE INVENTION

An object of the invention is therefore to provide a method of coupling a multi-core optical fiber to a plurality of single-core optical fibers, which method is simple to implement, is reproducible, and makes it possible to branch off some of the light, while retaining the optical and mechanical properties of the multi-core fiber.

To this end, the present invention provides a method of coupling a multi-core optical fiber to a plurality of single-core optical fibers, the multi-core optical fiber comprising N mutually parallel optical cores, where N is not less than 4, embedded in common optical cladding, and each of the single-core optical fibers comprising one optical core surrounded by optical cladding;

wherein said coupling is distributed over P coupling levels, where P is less than N and not less than 2, each coupling level including at least two single-core optical fibers, the coupling levels being offset longitudinally relative to one another along said multi-core optical fiber, and being such that each of said fibers belonging to the coupling levels is disposed parallel to and facing one of said cores of said multi-core fiber, and is secured to the optical cladding of said multi-core fiber over a "coupling" length, so as to obtain lateral evanescent-wave coupling between said cores of said single-core fibers and the cores of said multi-core fiber.

The method of the invention makes evanescent-wave coupling possible while avoiding problems of insufficient space around the multi-core optical fiber, without excessive machining being necessary that might deteriorate the optical and mechanical properties of the single-core fibers.

Moreover, unlike the butt-coupling solution, the solution of the invention does not require the optical lines to be cut, and therefore makes it possible to perform individual branch coupling without any drawback to transmission along the other cores of the multi-core fiber.

The method of the invention also offers the advantage of making both-way coupling possible.

Advantageously, prior to coupling, each of said single-core fibers is machined so as to remove a portion of its optical cladding over the coupling length, thereby reducing the thickness of said optical cladding over that length.

Such machining makes it possible to improve coupling by bringing the cores of the single-core fibers closer to those of the multi-core fiber.

The optical cladding of the single-core optical fibers may be machined by means of a diamond wire. Given that the number of couplings per level is less than the number of cores of the multi-core fiber, it is necessary merely to form a single curved surface on each of the single-core fibers because the available space around the multi-core fiber is sufficient to receive all the fibers of the same level without any machining being necessary other than that intended to bring their cores closer to their outside surfaces. Thus, machining can be performed in a single operation.

According to another advantageous characteristic of the invention, prior to coupling, the optical cladding of the multi-core fiber is machined so as to remove a portion of its optical cladding over the coupling length facing each of the levels, thereby reducing the thickness of said optical cladding over that length.

Such machining makes it possible to bring the cores to be coupled of the multi-core fiber closer to the outside surface thereof, thereby reducing any cross-talk that might appear if too large a thickness of cladding separates the cores of the multi-core fiber from the cores of the single-core fibers. If said thickness of cladding were too large, a portion of the coupled energy might dissipate into the cladding of the multi-core fiber and it might interfere with transmission or coupling in the other cores of said multi-core fiber.

For example, the optical cladding of the multi-core fiber may be machined by locally etching it with hydrofluoric acid.

In a first variant implementation of the method of the invention, the single-core optical fibers are secured to the multi-core optical fiber mechanically by means of clamping jaws exerting a variable clamping force on each of the single-core fibers so as to enable variable coupling to be obtained.

The clamping forces applied may be independent from one core to another of the multi-core fiber.

Such coupling is facilitated by the fact that, in the zone in which it is exerted, the clamping makes it possible to obtain a localized increase in the refractive index of the cladding in contact, so that coupling occurs more easily.

Furthermore, the coupling performed may be intermittent, i.e. it may be interrupted whenever necessary by relaxing the clamping exerted on the cores in which coupling is to be interrupted.

In an improvement to this implementation, the fibers to be coupled may be heated locally so as to subject their contact surfaces to a small amount of deformation, thereby obtaining intimate contact between them so as to improve the efficiency of coupling.

In a second variant implementation of the method of the invention, the single-core optical fibers are secured to the multi-core optical fiber by welding, in particular by means of a $CO_2$ laser.

By means of this method, the coupling obtained is very stable and easily reproducible. The power and the focussing of the laser beam are dimensioned so that heating is very localized, so that only the desired coupling is obtained.

BRIEF DESCRIPTION OF THE DRAWINGS

Other characteristics and advantages of the present invention appear from the following description of several implementations of the method of the invention given by way of non-limiting example, and with reference to the accompanying drawings, in which.

In all of these figures, common elements are given the same references.

MORE DETAILED DESCRIPTION

Figure 1:
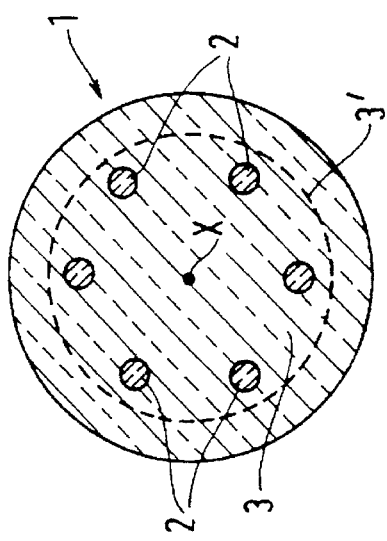
FIG. 1 is a cross-section through a multi-core optical fiber having 6 cores.

FIG. 1 is a diagrammatic cross-section through a multi-core fiber 1 comprising six optical cores 2 embedded in common optical cladding 3. Each of the optical cores 2 has a diameter lying in the range 7 μm to 10 μm, and they are disposed on a circle of radius approximately equal to 40 μm inside the optical cladding 3 which has an outside diameter of 125 μm. The optical cores 2 serve to guide the majority of the light waves conveyed by the multi-core fiber 1. For this purpose, the refractive index of the optical cladding 3 may, for example, be less than the refractive index of the cores 2.

In order to improve coupling the multi-core fiber 1 to single-core optical fibers, the thickness of the optical cladding 3 of the multi-core fiber 1 beyond the cores 2 may be reduced by suitable machining, e.g. by etching the optical cladding 3 with hydrofluoric acid. This machining is performed over the required coupling length. The outline 3' of the optical cladding obtained after machining is represented by a dashed line in FIG. 1.

Figure 2:
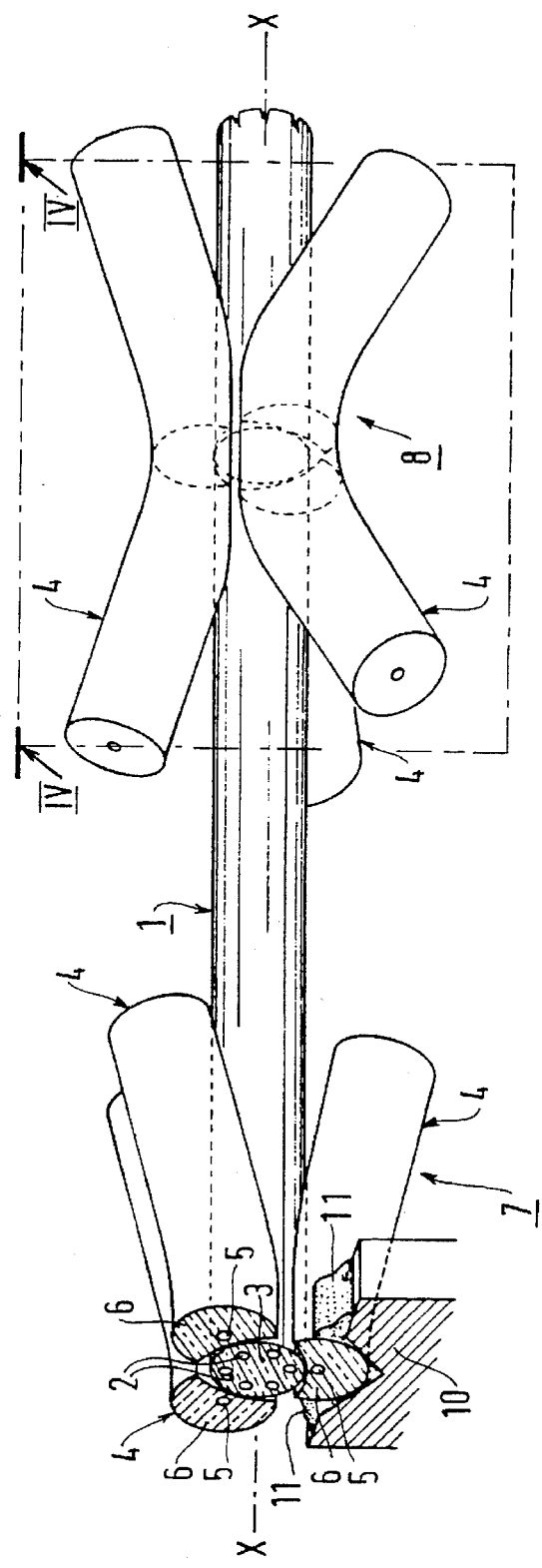
FIG. 2 shows coupling obtained by performing the first variant of the method of the invention.

FIG. 2 diagrammatically shows coupling obtained by performing a first variant of the invention, between firstly three of the optical cores 2 of the multi-core optical fiber 1 machined as described above, and secondly three single-core optical fibers 4, each of which includes an optical core 5 of diameter lying, for example, in the range 7 μm to 10 μm for guiding the majority of the light waves, the core being surrounded by optical cladding 6 of outside diameter substantially equal to 125 μm.

More precisely, FIG. 2 shows a coupling level 7 of the invention, i.e. a set of a plurality of single-core optical fibers 4 (three in the example shown) coupled to the multi-core optical fiber 1. At the coupling level, the optical cladding 6 of the single-core optical fibers 4 has been machined so as to bring the cores 5 closer to the outside surface of the multi-core fiber 1. Each of the single-core optical fibers 4 at the coupling level 7 is disposed parallel to a respective one of the cores 2 of the multi-core fiber 1 over a predetermined "coupling" length, that is necessary for evanescent-wave coupling to occur between the light waves conveyed by the cores 2 and 5. For example, the coupling length is less than 10 mm when the distance between the cores to be coupled together is about 10 μm.

Figure 4:
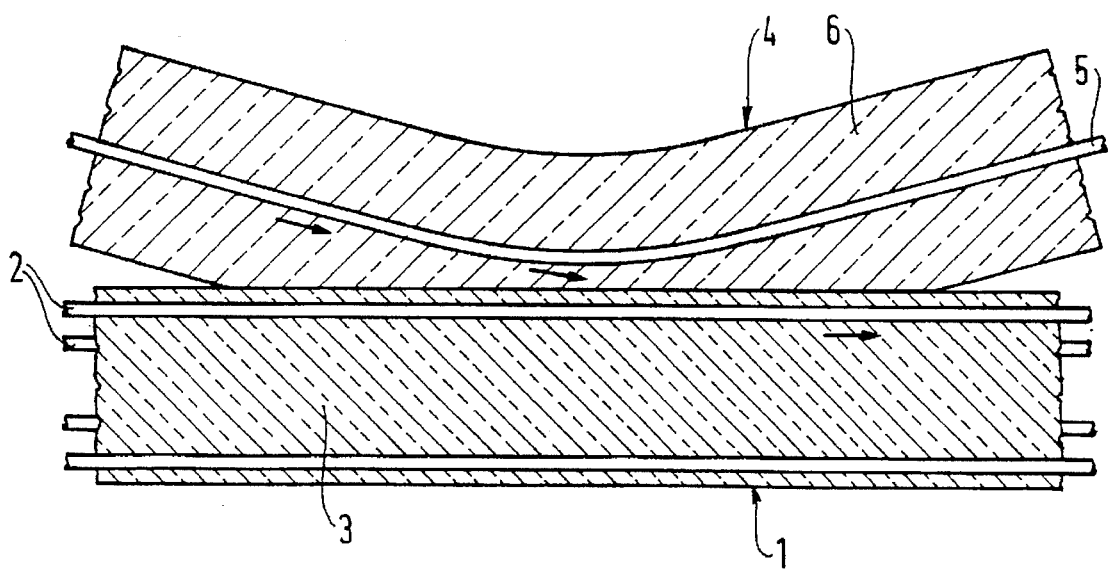
FIG. 4 is a longitudinal section on line IV—IV of FIGS. 2 and 3, showing the evanescent-wave coupling principle.

FIG. 4 is a longitudinal section on IV—IV of FIG. 2 showing the evanescent-wave coupling that occurs at the coupling level 7.

By machining the optical cladding 6 and the optical cladding 3, it is possible to bring the cores 2 of the multi-core fiber 1 closer to the cores 5 of the single-core fibers 4, and therefore to reduce any cross-talk that might appear if the cores were separated by too large a thickness of cladding.

In the first variant, clamping jaws 10, e.g. belonging to a chuck (not shown) are used to secure the single-core fibers 4 to the multi-core fiber 1 over the desired coupling length, only one of these clamping jaws being shown in FIG. 2 for reasons of clarity. Once a fiber 4 has been angularly positioned relative to the multi-core fiber 1, the corresponding clamping jaw 10 applies a clamping force against the multi-core fiber 1, thereby providing coupling, it being possible for the clamping force to be distinct and independent from one fiber 4 to another at the coupling level 7, so that the coupling coefficient can be varied and is not necessarily identical between the various fibers 4, which makes the method of the invention very flexible.

Furthermore, an intermediate medium 11 having a refractive index in the vicinity of that of the silica constituting the optical cladding 6 may be interposed at each clamping jaw 10 in order to limit optical losses.

By controlling the intensity of the clamping force at each jaw 10, and by monitoring the intensity of the light energy conveyed, it is possible to set the parameters of the desired coupling, and in particular to set the coupling coefficient to a required level.

In the first variant, the coupling is further facilitated by the fact that the clamping force exerted on the fibers causes a local increase in refractive index at the contact surfaces of the optical cladding.

In order to improve the coupling, the single-core fibers 4 and the multi-core fiber 1 may be heated locally in the zone to be coupled so as to subject their contact surfaces to deformation, thereby obtaining intimate contact between them and improving coupling efficiency.

In addition to the above-described coupling level 7, FIG. 2 shows another coupling level 8 that is identical in design to the coupling level 7, and that is offset longitudinally along the axis X of the multi-core fiber 1 relative to the coupling level 7.

Figure 3:
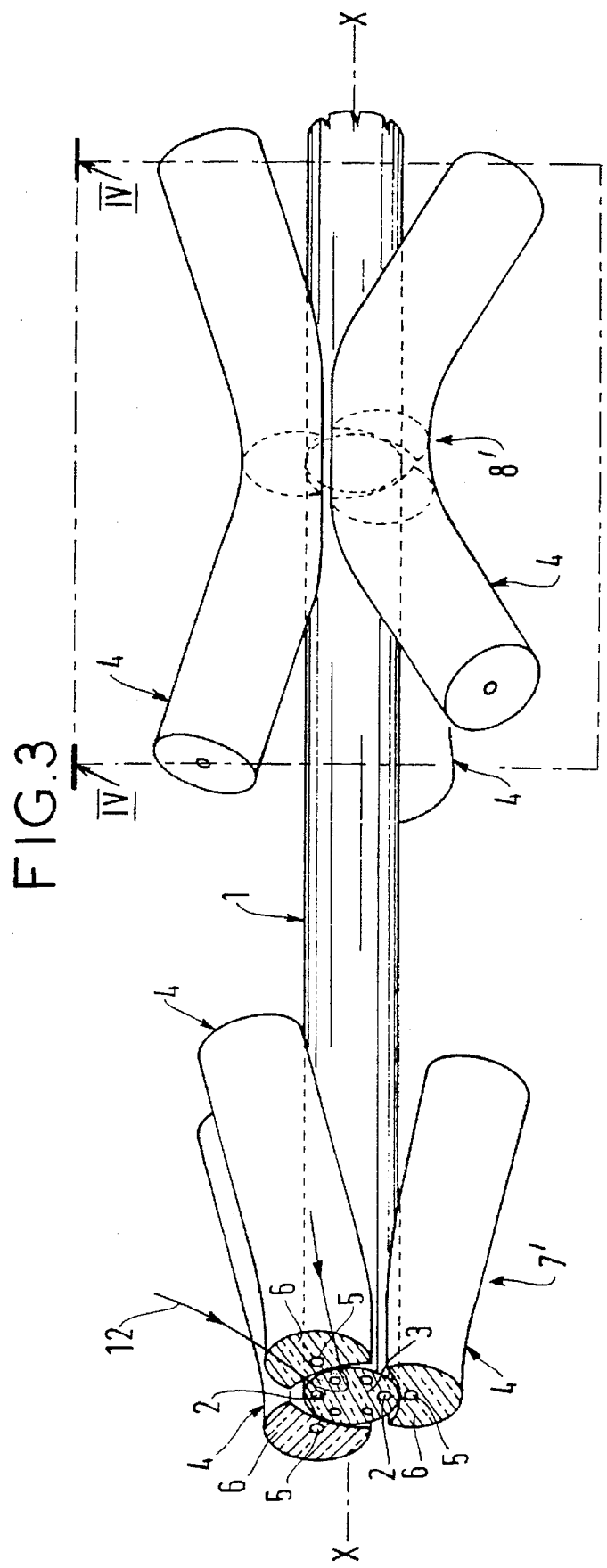
FIG. 3 shows coupling obtained by performing the second variant of the method of the invention.

FIG. 3 shows two coupling levels 7' and 8' in a second variant of the present invention, levels 7' and 8' being offset longitudinally relative to each other along the axis X. The difference between the coupling levels 7' and 8' and the coupling levels 7 and 8 lies in the fact that the single-core optical fibers 4 are secured to the multi-core optical fiber 1 by localized welding, e.g. by means of $CO_2$ laser radiation, which provides coupling that is very stable and that is reproducible.

In practice, to secure the single-core fibers to the multi-core fiber, the zone in which the securing is to be performed is illuminated, preferably in pulsed manner, by means of a laser beam 12 whose power and focussing are dimensioned so as to subject the relevant single-core fiber 4 to localized heating without interfering with the other cores 2. In this way, the cladding 3 and 6 is fused in part in said zone, and the desired securing is achieved.

In order to hold the fibers while they are being welded, clamping jaws may be used such as those shown in FIG. 2. The clamping laws are removed once welding has been performed.

In this variant as well, the clamping force exerted by the clamping jaw, and the light energy conveyed serve to set the coupling parameters so that the permanent coupling obtained after welding has the required characteristics.

FIG. 4 is also a longitudinal section on line IV—IV of FIG. 3.

Figure 5:
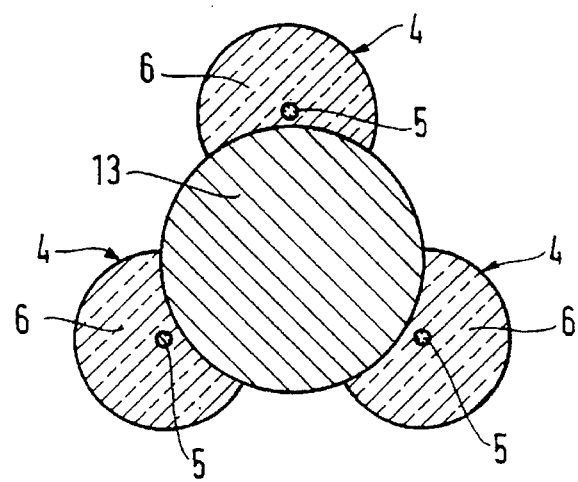
FIG. 5 diagrammatically shows how the single-core fibers are machined.

FIG. 5 very diagrammatically shows a method making it possible to machine the cladding 6 of the single-core optical fibers 4. In this method, three single-core fibers 4 can be machined simultaneously by means of a single cylindrical diamond wire 13 having substantially the same outside diameter as the multi-core optical fiber 1 as machined as shown in FIG. 1. The machining is performed by displacing the diamond wire 13 longitudinally so that friction occurs between the diamond wire and the optical cladding 6 of the single-core fibers 4 until the surfaces of the optical cladding 6 in contact with the diamond wire 13 substantially match the outside surface thereof.

The machining may be performed simultaneously on as many single-core fibers 4 as necessary, the maximum number of fibers 4 that can be machined simultaneously being limited by the space available around the multi-core optical fiber 1.

Naturally, the present invention is not limited to the above-described implementations.

Firstly, the invention is applicable to coupling levels including any number of single-core optical fibers, which number is preferably but not necessarily less than the number of cores of the multi-core optical fiber, so as to avoid any problems of insufficient space therearound, and it is not less than 2.

Furthermore, it is possible according to the invention to implement less couplings than there are cores in the multi-core fiber, e.g. when branch couplings are desired.

In addition, while being less than the number of cores in the multi-core optical fiber and not less than 2, the number of coupling levels may be arbitrary.

Moreover, the single-core fibers may be secured in each coupling by any suitable means, and not necessarily by means of clamping jaws or by welding.

The single-core fibers to be coupled are disposed around the periphery of the multi-core fiber, their disposition being a function of the geometrical configuration thereof, and in particular of the, positions of the cores of the multi-core fiber inside its optical cladding.

Finally, any means may be replaced with equivalent means without going beyond the ambit of the invention.

We claim:

1. A method of coupling a multi-core optical fiber to a plurality of single-core optical fibers, the multi-core optical fiber comprising N mutually parallel optical cores, where N is not less than 4, embedded in common optical cladding, and each of the single-core optical fibers comprising one optical core surrounded by optical cladding;

wherein said coupling is distributed over P coupling levels, where P is less than N and not less than 2, each coupling level including at least two single-core optical fibers, the coupling levels being offset longitudinally relative to one another along said multi-core optical fiber, and being such that each of said fibers belonging to the coupling levels is disposed parallel to and facing one of said cores of said multi-core fiber, and is secured to the optical cladding of said multi-core fiber over a "coupling" length, so as to obtain lateral evanescent-wave coupling between said cores of said single-core fibers and the cores of said multi-core fiber.

2. A method according to claim 1, wherein, prior to said coupling, each of said single-core fibers is machined so as to remove a portion of its optical cladding over said coupling length, thereby reducing the thickness of said optical cladding over that length.

3. A method according to claim 2, wherein said optical cladding of said single-core optical fibers is machined by means of a diamond wire.

4. A method according to claim 1, wherein, prior to said coupling, the optical cladding of said multi-core fiber is machined so as to remove a portion of its optical cladding over said coupling length facing each of said levels, thereby reducing the thickness of said optical cladding over that length.

5. A method according to claim 4, wherein said optical cladding of the multi-core fiber is machined by locally etching it with hydrofluoric acid.

6. A method according to claim 1, wherein said single-core optical fibers are secured to said multi-core optical fiber mechanically by means of clamping jaws.

7. A method according to claim 1, wherein said single-core optical fibers are secured to said multi-core optical fiber by welding.

8. A method according to claim 7, wherein said welding is performed by means of a $CO_2$ laser.

9. A method according to claim 1, wherein an intermediate medium having a refractive index that is close to that of the optical cladding of said single-core optical fibers and of said multi-core optical fiber is interposed therebetween over said coupling length.

* * * * *